(12) United States Patent  
Wasserman (10) Patent No.: US 7,418,415 B1  
(45) Date of Patent: Aug. 26, 2008

(54) OBJECT-ORIENTED REPRESENTATION OF A GENERIC PROFITABILITY RULE FOR FINANCIAL PROCESSING IN A RELATIONAL DATABASE MANAGEMENT SYSTEM

(75) Inventor: Brian J. Wasserman, Escondido, CA (US)

(73) Assignee: Teredata US, Inc., Miamisburg, OH (US)

( * ) Notice: Subject to any disclaimer, the term of this patent is extended or adjusted under 35 U.S.C. 154(b) by 1465 days.

(21) Appl. No.: 10/228,031

(22) Filed: Aug. 26, 2002

Related U.S. Application Data (63) Continuation-in-part of application No. 10/016,779, filed on Dec. 10, 2001, now Pat. No. 7,249,138, and a continuation-in-part of application No. 10/013,422, filed on Dec. 10, 2001, now abandoned, and a continuation-in-part of application No. 10/013,434, filed on Dec. 10, 2001, and a continuation-in-part of application No. 10/016,452, filed on Dec. 10, 2001, now Pat. No. 7,383,214.

(51) Int. Cl.  
*G06Q 40/00* (2006.01)

(52) U.S. Cl. .................................................... 705/35

(58) Field of Classification Search ............... 707/102; 705/35, 36 R  
See application file for complete search history.

(56) References Cited

U.S. PATENT DOCUMENTS

| | | | |
|---|---|---|---|
| 5,189,608 A | 2/1993 | Lyons et al. | |
| 5,249,120 A | 9/1993 | Foley | |
| 5,495,604 A * | 2/1996 | Harding et al. | 707/102 |
| 5,615,109 A | 3/1997 | Eder | |
| 5,655,085 A | 8/1997 | Ryan et al. | |
| 5,712,987 A | 1/1998 | Waits et al. | |
| 5,721,831 A | 2/1998 | Waits et al. | |
| 5,802,501 A * | 9/1998 | Graff | 705/36 R |
| 5,819,237 A | 10/1998 | Garman | |
| 5,875,437 A * | 2/1999 | Atkins | 705/40 |
| 5,911,135 A | 6/1999 | Atkins | |
| 5,978,779 A * | 11/1999 | Stein et al. | 705/37 |
| 5,991,743 A | 11/1999 | Irving et al. | |
| 6,018,722 A * | 1/2000 | Ray et al. | 705/36 R |
| 6,026,382 A | 2/2000 | Kalthoff | |

(Continued)

OTHER PUBLICATIONS

Kassing, Jay, "Profitability: Growing the Bottom Line," CSI, 1999, 43 pages.

(Continued)

*Primary Examiner*—Andrew Joseph Rudy  
(74) *Attorney, Agent, or Firm*—Gates & Cooper, LLP (57) ABSTRACT

A Value Analyzer system is a data-driven computer-facilitated financial model that provides accurate and consistent profitability calculations using account, product and event attributes stored in a relational database managed by a relational database management system (RDBMS). Profitability calculations are performed in the computer by applying one or more rules to the account, product and event attributes accessed from the database, wherein each of the rules is represented as one or more objects in a hierarchy, the objects include one or more relations, criteria lists and criteria, each of the relations includes one or more of the criteria lists, and each of the criteria lists includes one or more of the criteria, and the criteria determine which accounts, products and events are processed in the profitability calculations.

39 Claims, 4 Drawing Sheets

U.S. PATENT DOCUMENTS

| | | | |
|---|---|---|---|
| 6,085,175 | A | 7/2000 | Gugel et al. |
| 6,233,566 | B1 | 5/2001 | Levine et al. |
| 6,240,399 | B1 * | 5/2001 | Frank et al. ............... 705/36 R |
| 6,249,770 | B1 * | 6/2001 | Erwin et al. .................. 705/10 |
| 6,253,192 | B1 | 6/2001 | Corlett et al. |
| 6,275,813 | B1 | 8/2001 | Berka |
| 6,292,787 | B1 | 9/2001 | Scott et al. |
| 6,360,210 | B1 | 3/2002 | Wallman |
| 6,393,400 | B1 * | 5/2002 | Shigetomi et al. ........... 704/258 |
| 6,393,406 | B1 | 5/2002 | Eder |
| 6,442,533 | B1 * | 8/2002 | Hinkle ..................... 705/36 R |
| 6,542,905 | B1 * | 4/2003 | Fogel et al. ................. 707/200 |
| 6,633,883 | B2 * | 10/2003 | Koskas ....................... 707/101 |
| 6,826,541 | B1 * | 11/2004 | Johnston et al. ........... 705/36 R |
| 6,976,000 | B1 * | 12/2005 | Manganaris et al. .......... 705/10 |
| 7,050,997 | B1 * | 5/2006 | Wood, Jr. .................. 705/36 R |
| 7,069,234 | B1 * | 6/2006 | Cornelius et al. ............. 705/26 |
| 7,130,859 | B2 * | 10/2006 | Kobayashi .................. 707/102 |
| 2002/0026394 | A1 | 2/2002 | Savage et al. |

OTHER PUBLICATIONS

"Canadian Bank Mines for Data-based Gold," Action Items, Dec. 2, 1997, 2 pages.

"Bank of Ireland Selects Compaq AlphaServers to Help Improve Profitability Management," Dec. 3, 1998, Compaq, 2 pages.

"Marquis Tops 300 MCIF-CRM Data Mart Clients Worldwide," Apr. 18, 2000, 2 pages.

Curley, Bob, "Royal Bank unearths profitability solution", Bank Systems & Technology, Apr. 2000, 2 pages.

Middleton, Arthur, "How Profitability Analysis is Used in Financial Services Marketing", date unknown, 3 pages.

* cited by examiner

OBJECT-ORIENTED REPRESENTATION OF A GENERIC PROFITABILITY RULE FOR FINANCIAL PROCESSING IN A RELATIONAL DATABASE MANAGEMENT SYSTEM

CROSS REFERENCE TO RELATED APPLICATIONS

This application is a continuation-in-part of the following co-pending and commonly assigned patent applications:

Utility application Ser. No. 10/227,909, filed on same date herewith, by Brian J. Wasserman and Thomas K. Ryan, entitled "PLATFORM INDEPENDENT ARCHITECTURE FOR FINANCIAL PROCESSING IN A RELATIONAL DATABASE MANAGEMENT SYSTEM,";

Utility application Ser. No. 10/227,783, filed on same date herewith, by George R. Hood, Brian J. Wasserman, Thomas K. Ryan and Sang Y. Yum, entitled "SELECTION PROCESSING FOR FINANCIAL PROCESSING IN A RELATIONAL DATABASE MANAGEMENT SYSTEM,";

Utility application Ser. No. 10/227,726, filed on same date herewith, by Richard C. Schwarz, Brian J. Wasserman, Sang Y. Yum and Thomas K. Ryan, entitled "DRIVER AMOUNT/COUNT SELECTION FOR FINANCIAL PROCESSING IN A RELATIONAL DATABASE MANAGEMENT SYSTEM,";

Utility application Ser. No. 10/227,976, filed on same date herewith, by Richard C. Schwarz, Brian J. Wasserman, Sang Y. Yum and Thomas K. Ryan, entitled "DRIVER AMOUNT/COUNT SELECTION FOR FINANCIAL PROCESSING IN A RELATIONAL DATABASE MANAGEMENT SYSTEM,";

Utility application Ser. No. 10/228,022, filed on same date herewith, by Brian J. Wasserman, George R. Hood and Thomas K. Ryan, entitled "DISCRETE PROFITABILITY CALCULATIONS FOR FINANCIAL PROCESSING IN A RELATIONAL DATABASE MANAGEMENT SYSTEM,";

Utility application Ser. No. 10/016,779, filed on same date herewith, by Brian J. Wasserman, George R. Hood and Thomas K. Ryan, entitled "RULES-BASED, DATA-DRIVEN PROFITABILITY CALCULATIONS FOR FINANCIAL PROCESSING IN A RELATIONAL DATABASE MANAGEMENT SYSTEM," which is a continuation-in-part of the applications listed herein that are identified by Ser. Nos. 10/013,422, 10/013,434, and 10/016,452;

Utility application Ser. No. 10/013,422, filed on Dec. 10, 2001, now abandoned, by Brian J. Wasserman, entitled "ACCOUNT SELECTION FOR FINANCIAL PROCESSING IN A RELATIONAL DATABASE MANAGEMENT SYSTEM,", which is a continuation-in-part of the applications listed herein that are identified by Ser. Nos. 10/016,779, 10/013,434, and 10/016,452;

Utility application Ser. No. 10/013,434, filed on Dec. 10, 2001, by Brian J. Wasserman, entitled "DRIVER AMOUNT AND COUNT SELECTION PROCESSING FOR FINANCIAL PROCESSING IN A RELATIONAL DATABASE MANAGEMENT SYSTEM,", which is a continuation-in-part of the applications listed herein that are identified by Ser. Nos. 10/016,779, 10/013,422, and 10/016,452; and Utility application Ser. No. 10/016,452, filed on Dec. 10, 2001, now U.S. Pat. No. 7,383,214, by Brian J. Wasserman, George R. Hood, and Thomas K. Ryan, entitled "DYNAMIC EVENT SELECTION FOR FINANCIAL PROCESSING IN A RELATIONAL DATABASE MANAGEMENT SYSTEM,", which is a continuation-in-part of the applications listed herein that are identified by Ser. Nos. 10/016,779, 10/013,422, 10/013,434, 09/845,461, 09/845,924, 09/845,851, 09/608,355, 09/610,646, 09/608,681, 09/608,675, 09/608,342 and 09/608,682;

all of which applications are incorporated by reference herein.

Further, the applications listed herein that are identified by Ser. Nos. 10/227,783, 10/227,976, and 10/228,022 each is a continuation-in-part of the following co-pending and commonly assigned patent applications:

Utility application Ser. No. 09/845,461, filed on Apr. 30, 2001, by George R. Hood, entitled "TAX ADJUSTMENT FOR FINANCIAL PROCESSING IN A RELATIONAL DATABASE MANAGEMENT SYSTEM,", which is a continuation-in-part of the applications listed herein that are identified by Ser. Nos. 09/608,355, 09/610,646, 09/608,681, 09/608,675, 09/608,342 and 09/608,682;

Utility application Ser. No. 09/845,924, filed on Apr. 30, 2001, by George R. Hood, entitled "AMORTIZATION FOR FINANCIAL PROCESSING IN A RELATIONAL DATABASE MANAGEMENT SYSTEM,", which is a continuation-in-part of the applications listed herein that are identified by Ser. Nos. 09/608,355, 09/610,646, 09/608,681, 09/608,675, 09/608,342, and 09/608,682;

Utility application Ser. No. 09/845,851, filed on Apr. 30, 2001, by George R. Hood, entitled "SHAREHOLDER VALUE ADD FOR FINANCIAL PROCESSING IN A RELATIONAL DATABASE MANAGEMENT SYSTEM,", which is a continuation-in-part of the applications listed herein that are identified by Ser. Nos. 09/608,355, 09/610,646, 09/608,681, 09/608,675, 09/608,342, and 09/608,682;

Utility application Ser. No. 09/608,355, filed on Jun. 29, 2000, by George R. Hood and Paul H. Phibbs, Jr., entitled "ADVANCED AND BREAKTHROUGH NET INTEREST REVENUE IMPLEMENTATION FOR FINANCIAL PROCESSING IN A RELATIONAL DATABASE MANAGEMENT SYSTEM,";

Utility application Ser. No. 09/610,646, filed on Jun. 29, 2000, by George R. Hood and Paul H. Phibbs, Jr., entitled "BASIC AND INTERMEDIATE NET INTEREST REVENUE IMPLEMENTATION FOR FINANCIAL PROCESSING IN A RELATIONAL DATABASE MANAGEMENT SYSTEM,";

Utility application Ser. No. 09/608,681, filed on Jun. 29, 2000, by George R. Hood, entitled "OTHER REVENUE IMPLEMENTATION FOR FINANCIAL PROCESSING IN A RELATIONAL DATABASE MANAGEMENT SYSTEM,";

Utility application Ser. No. 09/608,675, filed on Jun. 29, 2000, by George R. Hood, entitled "DIRECT EXPENSE IMPLEMENTATION FOR FINANCIAL PROCESSING IN A RELATIONAL DATABASE MANAGEMENT SYSTEM,";

Utility application Ser. No. 09/608,342, filed on Jun. 29, 2000, by George R. Hood, entitled "INDIRECT EXPENSE IMPLEMENTATION FOR FINANCIAL PROCESSING IN A RELATIONAL DATABASE MANAGEMENT SYSTEM,"; and Utility application Ser. No. 09/608,682, filed on Jun. 29, 2000, by George R. Hood, entitled "RISK PROVISION IMPLEMENTATION FOR FINANCIAL PROCESSING IN A RELATIONAL DATABASE MANAGEMENT SYSTEM,";

all of which applications are incorporated by reference herein.

Finally, this application is related to the following co-pending and commonly assigned patent applications:

Utility application Ser. No. 09/943,060, filed on Aug. 30, 2001, by Paul H. Phibbs, Jr., entitled "CAPITAL ALLOCATION IN A NET INTEREST REVENUE IMPLEMENTATION FOR FINANCIAL PROCESSING IN A RELATIONAL DATABASE MANAGEMENT SYSTEM,", which claims the benefit under 35 U.S.C. 5119(e) to Provisional Application Ser. No. 60/253,281, filed Nov. 27, 2000, by Paul H. Phibbs, Jr., entitled "CAPITAL ALLOCATION IN A NET INTEREST REVENUE IMPLEMENTATION FOR FINANCIAL PROCESSING IN A RELATIONAL DATABASE MANAGEMENT SYSTEM,", and Provisional Application Ser. No. 60/253,254, filed Nov. 27, 2000, by Paul H. Phibbs, Jr., entitled "ALLOCATED BALANCES IN A NET INTEREST REVENUE IMPLEMENTATION FOR FINANCIAL PROCESSING IN A RELATIONAL DATABASE MANAGEMENT SYSTEM,", and which is a continuation-in-part of the applications listed herein that are identified by Ser. Nos. 09/608,355 and 09/610,646;

Utility application Ser. No. 09/943,059, filed on Aug. 30, 2001, by Paul H. Phibbs, Jr., entitled "ALLOCATED BALANCES IN A NET INTEREST REVENUE IMPLEMENTATION FOR FINANCIAL PROCESSING IN A RELATIONAL DATABASE MANAGEMENT SYSTEM,", which claims the benefit under 35 U.S.C. §119(e) to Provisional Application Ser. No. 60/253,254, filed Nov. 27, 2000, by Paul H. Phibbs, Jr., entitled "ALLOCATED BALANCES IN A NET INTEREST REVENUE IMPLEMENTATION FOR FINANCIAL PROCESSING IN A RELATIONAL DATABASE MANAGEMENT SYSTEM,", and Provisional Application Ser. No. 60/253,281, filed Nov. 27, 2000, by Paul H. Phibbs, Jr., entitled "CAPITAL ALLOCATION IN A NET INTEREST REVENUE IMPLEMENTATION FOR FINANCIAL PROCESSING IN A RELATIONAL DATABASE MANAGEMENT SYSTEM,", and which is a continuation-in-part of the applications listed herein that are identified by Ser. Nos. 09/608,355 and 09/610,646;

both of which applications are incorporated by reference herein.

BACKGROUND OF THE INVENTION

1. Field of the Invention

This invention relates in general to financial processing systems performed by computers, and in particular, to the implementation of object-oriented representations of generic profitability rules for financial processing using data accessed from a relational database management system.

2. Description of Related Art

Financial processing systems provide tools for financial analysis of accounting data. Typically, each financial processing system operates in a unique way and approaches financial analysis differently. Some financial processing systems are advanced in their approach to profitability calculations, and others are still at a more basic level. In addition, there is no agreement as to the rules for profitability calculations, outside of generally accepted accounting policies that external auditors use.

Yet, the majority of financial processing systems are inefficient in their accessing of relational databases. There is a need, then, for an improved approach for performing financial processing from a relational database, especially in the area of the representation of profitability rules.

SUMMARY OF THE INVENTION

A Value Analyzer system is a data-driven computer-facilitated financial model that provides accurate and consistent profitability calculations using account, product and event attributes stored in a relational database managed by a relational database management system (RDBMS).

The present invention performs financial processing in a computer by: (a) accessing account, product and event attributes from a database, wherein: (1) the account attributes comprise data about accounts being measured, (2) the product attributes comprise data about products being purchased, and (3) the event attributes comprise data about account-related and product-related transactions; (b) performing one or more profitability calculations by applying one or more rules to the account, product and event attributes accessed from the database; and (c) wherein each of the rules is represented as one or more objects in a hierarchy, the objects include one or more relations, criteria lists and criteria, each of the relations includes one or more of the criteria lists, and each of the criteria lists includes one or more of the criteria, and the criteria determine which accounts, products and events are processed in the profitability calculations. The hierarchy includes a root node and the root node represents the rule. Each of the relations corresponds to a combination of selection criteria that comprise account attributes, product attributes, and event attributes, as well as predicates, operations and functions operating thereon. The criteria lists are selected from a group comprised of an account criteria list, product criteria list, and event criteria list. The criteria are selected from a group comprised of an account attribute criteria, product attribute criteria, and event attribute criteria, wherein the criteria comprise one or more elements selected from a group comprising attributes, predicates, operators and functions, and the criteria compare an attribute to another attribute, a literal value, or a result. Each of the rules comprises at least one of the criteria lists and the criteria list comprises at least one of the criteria, and the rules are selected from a group comprising Risk Provision (RP) Rules, Net Interest Revenue (NIR) Rules, Direct Expense (DE) Rules, Indirect Expense (IE) Rules, and Other Revenue (OR) Rules, and the rules are selected from a group comprising Basic, Intermediate, Advanced, and Breakthrough Rules. The objects are stored in a relational database, include queries to load and save the objects.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

A Value Analyzer system is a data-driven computer-facilitated financial model that provides accurate and consistent profitability calculations using account, product and event attributes stored in a relational database managed by a relational database management system (RDBMS).

Hardware and Software Environment

Figure 1:
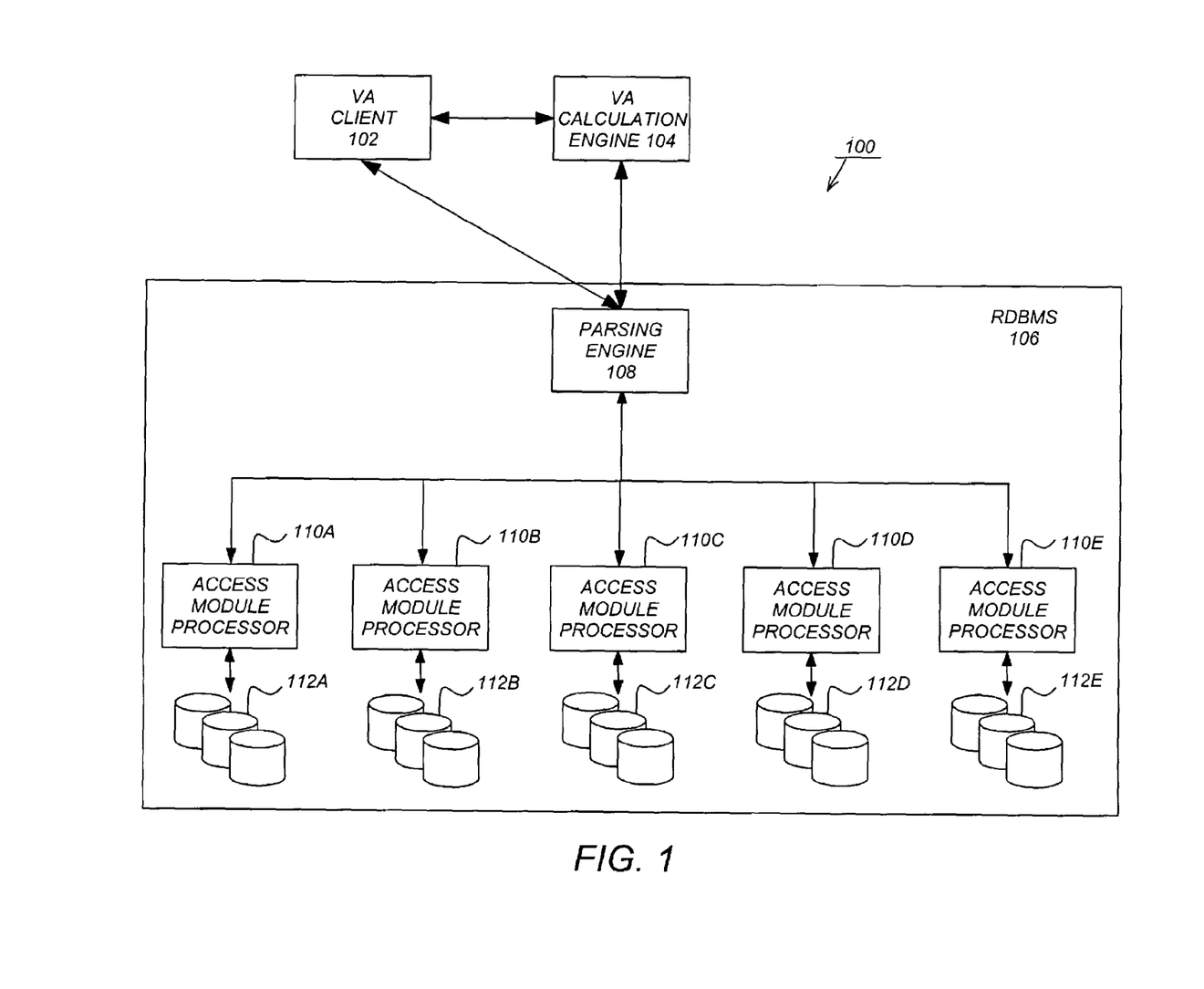
FIG. 1 illustrates an exemplary hardware and software environment according to the preferred embodiment of the present invention.

FIG. 1 illustrates an exemplary hardware and software environment according to the preferred embodiment of the present invention. In the exemplary environment, a computer system 100 implements a financial processing system, known as the Value Analyzer system, in a three-tier client-server architecture, wherein the first or client tier provides a Value Analyzer Client 102 that may include, inter alia, a graphical user interface (GUI), the second or middle tier provides a Value Analyzer Calculation Engine 104 for performing functions as described later in this application, and the third or server tier comprises a Relational DataBase Management System (RDBMS) 106 that stores data and metadata in a relational database. The first, second, and third tiers may be implemented in separate machines, or may be implemented as separate or related processes in a single machine.

In the preferred embodiment, the RDBMS 106 includes at least one Parsing Engine (PE) 108 and one or more Access Module Processors (AMPs) 110A-110E storing the relational database in one or more data storage devices 112A-112E. The Parsing Engine 108 and Access Module Processors 110 may be implemented in separate machines, or may be implemented as separate or related processes in a single machine. The RDBMS 106 used in the preferred embodiment comprises the Teradata® RDBMS sold by NCR Corporation, the assignee of the present invention, although other DBMS's could be used.

Generally, the Value Analyzer Client 102 includes a graphical user interface (GUI) for operators of the system 100, wherein requests are transmitted to the Value Analyzer Calculation Engine 104 and/or the RDBMS 106, and responses are received therefrom. In response to the requests, the Value Analyzer Calculation Engine 104 performs the functions described below, including formulating queries for the RDBMS 106 and processing data retrieved from the RDBMS 106. Moreover, the results from the functions performed by the Value Analyzer Calculation Engine 104 may be provided directly to the Value Analyzer Client 102 or may be provided to the RDBMS 106 for storing into the relational database. Once stored in the relational database, the results from the functions performed by the Value Analyzer Calculation Engine 104 may be independently retrieved from the RDBMS 106 by the Value Analyzer Client 102.

Note that the Value Analyzer Client 102, the Value Analyzer Calculation Engine 104, and the RDBMS 106 may be implemented in separate machines, or may be implemented as separate or related processes in a single machine. Moreover, in the preferred embodiment, the system 100 may use any number of different parallelism mechanisms to take advantage of the parallelism offered by the multiple tier architecture, the client-server structure of the Value Analyzer Client 102, Value Analyzer Calculation Engine 104, and RDBMS 106, and the multiple Access Module Processors 110 of the RDBMS 106. Further, data within the relational database may be partitioned across multiple data storage devices 112 to provide additional parallelism.

Generally, the Value Analyzer Client 102, Value Analyzer Calculation Engine 104, RDBMS 106, Parsing Engine 108, and/or Access Module Processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Value Analyzer Operation

The Value Analyzer system is a data-driven computer-facilitated financial model that provides accurate and consistent profitability calculations using account, event and organization data stored in the RDBMS 106, wherein: (1) the account attributes comprise data about accounts being measured, (2) the event attributes comprise data about account-related transactions, and (3) the organization attributes comprise data about the organization's financial status. The profitability calculations performed by the Value Analyzer system rely on a Five Factor Atomic Profit Metric (FFAPM):

Profit=Net Interest Revenue (NIR)

+Other Revenue (OR)

−Direct Expense (DE)

−Indirect Expense (IE)

−Risk Provision (RP)

=NIR+OR−DE−IE−RP

In the above equation, it is assumed that the sign of elements that reduce profit are negative and those that contribute are positive.

Each of the five factors of FFAPM are defined below:

Net Interest Revenue. This component comprises interest revenue, and is the largest component of profitability (e.g., from loans, deposits, cash, etc.).

Other Revenue. This component comprises non-interest revenue (e.g., fees and commissions), including those driven by events (e.g., open account, excessive counter withdrawals, early payout penalties, etc.).

Direct Expense. This component comprises expenses driven by events that are attributable to accounts.

Indirect Expense. This component comprises expenses that are not attributable to specific accounts. This includes expenses that relate to the cost of doing business that are not driven by account or event activity, such as those that arise from overheads, inefficiencies or differences between standard and actual costs (e.g., the CEO's salary, etc.).

Risk Provision. This component comprises the expected cost of risks that arise from the uncertainties of doing business, e.g., market risks, customer credit, competition, operations, regulatory risks, political risks, etc.

Each of these five factors can be measured for a desired period (daily, weekly, monthly, quarterly, etc.). Moreover, each factor is essentially discrete and independent with fundamentally different characteristics, which strengthens the user's ability to fully utilize the output to determine relationships between account, event and organization data, and enable consistent multiple dimensional aggregation.

The FFAPM is "atomic" in that profitability is computed using data stored in the RDBMS 106. There are three aspects to this:

- components of profitability may be measured below the account level (at events which make up account activity over an accounting period) and accumulated to the account,
- components of profitability may be measured directly at the account level (such as interest paid or earned for an accounting period),
- components of profitability may be known, obtained, or aggregated at a higher level, and may be apportioned down to specific accounts and events according to various rules.

The Value Analyzer generally defines "indirect" components of profitability to be those which must be apportioned to accounts and "direct" components to be those which are either computed at the account level, or are rolled up to the account level from lower level events.

Value Analyzer Data Flow

Figure 2:
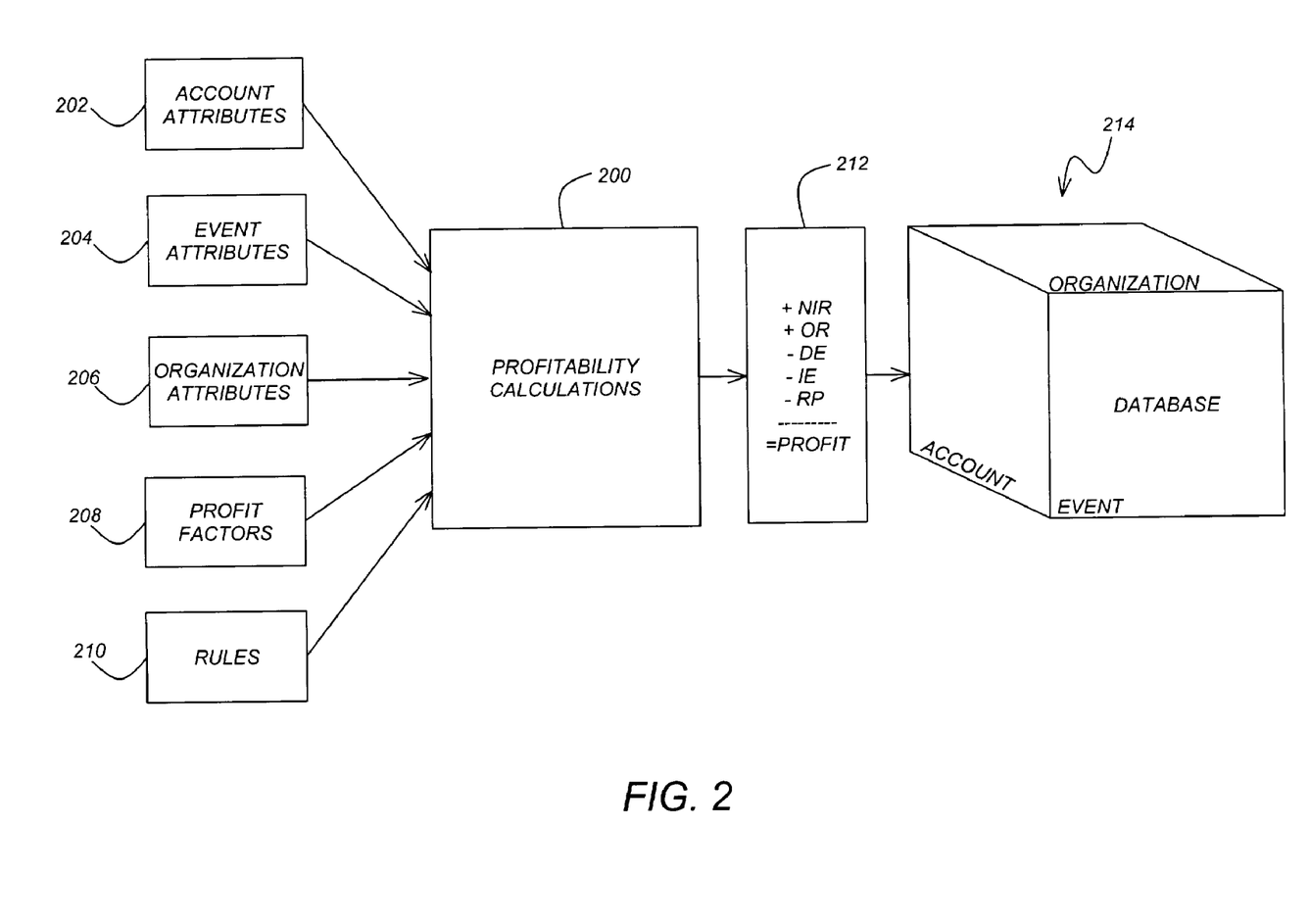
FIG. 2 is a data flow diagram that illustrates the operation of the Value Analyzer according to the preferred embodiment of the present invention.

FIG. 2 is a data flow diagram that illustrates the operation of the Value Analyzer system according to the preferred embodiment of the present invention. Within the Value Analyzer Calculation Engine 104, one or more Profitability Calculations 200 accept a number of inputs including Account Attributes 202, Event Attributes 204, Organization Attributes 206, and Profit Factors 208. Thereafter, the Profitability Calculations 200 invoke one or more Rules 210 that generate the FFAPM 212, which in turn are used to create the Database 214. The Database 214 may be represented along account, event, or organization dimensions, or along other dimensions as may be required. These elements are described in more detail below.

Input Definitions

Account Attributes 202 comprise data about the accounts being measured. This data includes: balance, rate (or interest accrued), product identification, limits, expected default frequency, and various dates (e.g., open, rate reset, last payment, next payment, maturity, etc.).

Event Attributes 204 comprise data about account-related events or transactions. This data includes: account identification, event or transaction amounts, event or transaction location, event or transaction time, counter-party identification, event or transaction type (e.g., loan payment, interest paid, loan draw down amount, etc.).

Organization Attributes 206 comprise data about the financial status of the organization. This data includes: balance sheet and profit statement amounts aggregated by the legal or management entities that own the account base being measured.

Profit Factors 208 include parameter values necessary to perform the Profitability Calculations 200. The major classifications of this data include:

Funds transfer rates are pricing methods that require matched maturity opportunity rates for use in valuing each account's marginal use or source of internal funds.

Unit costs are used for Direct Expense calculations, where a total cost is provided as an Organization Attribute 206 and the Unit Cost is then derived by dividing total cost by actual volume. Unit Costs can be either standard, actual, or market, and ideally represent marginal values (if "fully absorbed measures" are used, then the usefulness of allocated amounts is diminished.)

Allocated amounts are used in both Other Revenue and Indirect Expense calculations, wherein the allocated amounts are apportioned amongst all accounts in a group.

Miscellaneous calculation values may comprise, for example, the number of days in a profit measurement period, an equity allocation weighting, etc. These values are known as "modeling" parameters.

Amortization parameters are used in interest amortization, which requires interest rates and life values used by straight-line amortization and by declining balance of amortization.

Risk measurement parameters are used in Risk Provision calculations, which require various factors, such as: loss rates, reserve percentages, exposure factors, recovery rates, default probabilities and collection costs.

Tax rates are required for after-tax profit calculation. The Value Analyzer is designed to calculate pre-tax income on a taxable equivalent basis (where an effective tax rate is all that is required to transform pre-tax income into after tax earnings, i.e., Profit).

Rules

The Profitability Calculations 200 use one or more Rules 210 applied to data retrieved from the RDBMS 106. These Rules 210 include, inter alia, the following:

Treatments. Every account with cash flows affecting a organization's balance sheet requires a method of valuing the account's use of internal funds. One approach is "matched maturity funds transfer pricing," which uses a canonical representation of an account's funding characteristics and then determines a value based on adjusted market yields for each instance that requires an interest rate transfer price to calculate an account's marginal Net Interest Revenue.

Equity Allocation. In order to provide precise Net Interest Revenue calculations, the amount of equity funds required at an account must be determined. This rule allows for equity allocation using any of the following methods: simple ratios; regulatory definitions; economic allocations, or user defined allocations.

Apportionment. Other Revenue, Risk Provision and Indirect Expense calculations are applied at the account level using Organization Attributes 206 that are not related directly to account activity. These profit adjustments are made so that the sum of all account-level Profitability Calculations 200 comprises the overall profit. One approach is to pool indirect costs and revenues and then apportion them. Apportionment rules specify how the pooled indirect costs and revenues is completely allocated to appropriate accounts, wherein the preferred embodiment uses closed form allocation rules, which require only information known in the current period and not iterative computation.

Amortization. Some types of income or expense are deferred or accrued over multiple periods, including and subsequent to the current accounting period. This is common to accrual accounting methods used in profit presentations of financial statements, and gives rise to timing differences between cash flows and their related profit as presented in a financial statement in any accounting period. Since the Value Analyzer system is designed to reconcile to the financial statement's profit values, it supports deferral and accrual accounting principles. Amortization methods that account for these timing differences are: interest amortization (used for interest income and expense accruals and for deferral of fees that are in lieu of interest), and straight line or declining balance amortizations (used for cost deferrals and investment depreciation).

Other Revenue Pricing. In situations where account and event activity can be used to derive account level income or fees, the Value Analyzer system calculates these drivers of the profitability in the Other Revenue calculations. These calculations comprise linear combinations of event or account values and modeled coefficients.

Direct Expense. The calculation of account profit adjustments due to account-related activity requires rules that take the form of linear combinations of event or account values and modeled coefficients.

Indirect Expense. In situations where expense apportionment or amortization amounts are aggregated, the user may want different rules applied depending on the path (or dimension) of aggregation. These rules allow for multiple Profitability Calculations rules to be applied to derive multiple account level Indirect Expense amounts.

Risk Provision. Adjusting current profit for expected future losses is known as "actuarial" profit provisioning. The Value Analyzer system applies actuarial-based methods in its account level Profitability Calculations, where the actuarial reserve that the provisions maintain represents the expected loss associated with all accounts.

Taxable Equivalent Gross-up. Profit is an after-tax measure, and thus some events or portions of some accounts' profits may be excluded from normal taxation. The Value Analyzer system adjusts these pre-tax values, so that a singular tax rate can be used to convert pre-tax profit into after-tax values, which are also known as taxable equivalent adjustment. These rules use account and event attributes to adjust each of the five factors of the FFAPM to a taxable equivalent basis.

Interest Yield Adjustments. Since the Value Analyzer system can calculate profits for any number of periods, the adjustment of cash interest payments, and the financial statement's accrual or smoothed representation of interest-related Profit, the Value Analyzer system provides a method for converting cash interest amounts to accrual amounts for financial statements. The Value Analyzer system implements an "effective interest rate" conversion to accomplish this type of calculation.

Profitability Calculations

The following describes the method used by the Profitability Calculations 200:
1. Retrieve data from the RDBMS 106.
2. Calculate Net Interest Revenue for every account.
3. Calculate Other Revenue for every account.
4. Calculate Direct Expense for every account.
5. Calculate Indirect Expense for every account.
6. Calculate Risk Provision for every account.
7. Calculate Profit for every account.
8. Store the FFAPM Profit and the five factors of FFAPM into the RDBMS 106.
9. Aggregate and/or re-calculate the FFAPM Profit and the five factors of FFAPM as necessary.

Note that steps 2 through 6 perform account-level calculations. Steps 2, 3, 4, 5, and 6 can be performed independently and in parallel, while step 7 requires values derived in steps 2, 3, 4, 5, and 6, and therefore must be performed after steps 2, 3, 4, 5, and 6 are completed.

Output Definition

The Profitability Calculations 200 generate one or more values for the five factors of the FFAPM 212, and specifically, the NIR, OR, DE, IE, RP, and Profit values. These values are used to generate the Database 214, which comprises one or more tables stored by the RDBMS 106 in the relational database.

Object Oriented Representation of Profitability Calculation Rules

In the Value Analyzer system, there are many types of Rules 210 used in the Profitability Calculations 200, such as Risk Provision (RP) Rules, Net Interest Revenue (NIR) Rules, Direct Expense (DE) Rules, Indirect Expense (IE) Rules, and Other Revenue (OR) Rules, as well as different levels (Basic, Intermediate, Advanced, Breakthrough) for each type of Rule 210.

The present invention represents all of the common data attributes and functionality common to all Rules 210 in a single, reusable class hierarchy that can then be inherited by class specifications for all specific types and levels of Rules 210. Moreover, the class specifications combine these common data attributes and functionality with specific data attributes and functionality for each Rule 210. The common and specific data attributes include Selection Criteria (Account Attributes, Product Attributes, and Event Group Attributes) that identify the set of Accounts to which the Rule 210 will be applied by the Value Analyzer Calculation Engine 104. The common and specific functionality includes operations performed on the relational database (insert, select, modify and delete), since the Rules 210 are stored in one or more tables of the relational database managed by the RDBMS 106.

The benefit of the present invention is to simply the implementation of Rules 210, and reduce the amount of source code that is created. For example, the class hierarchy avoids the replication of source code and functionality for each specific type and level of Rule 210. In addition, the present invention improves both the quality and maintainability of the Value Analyzer system, since there is a single location for most source code, which makes it easier to test and debug. Moreover, the present invention significantly decreases the time and cost of both development and maintenance of the Value Analyzer system.

Common Classes of the Generic Profitability Rule

Figure 3:
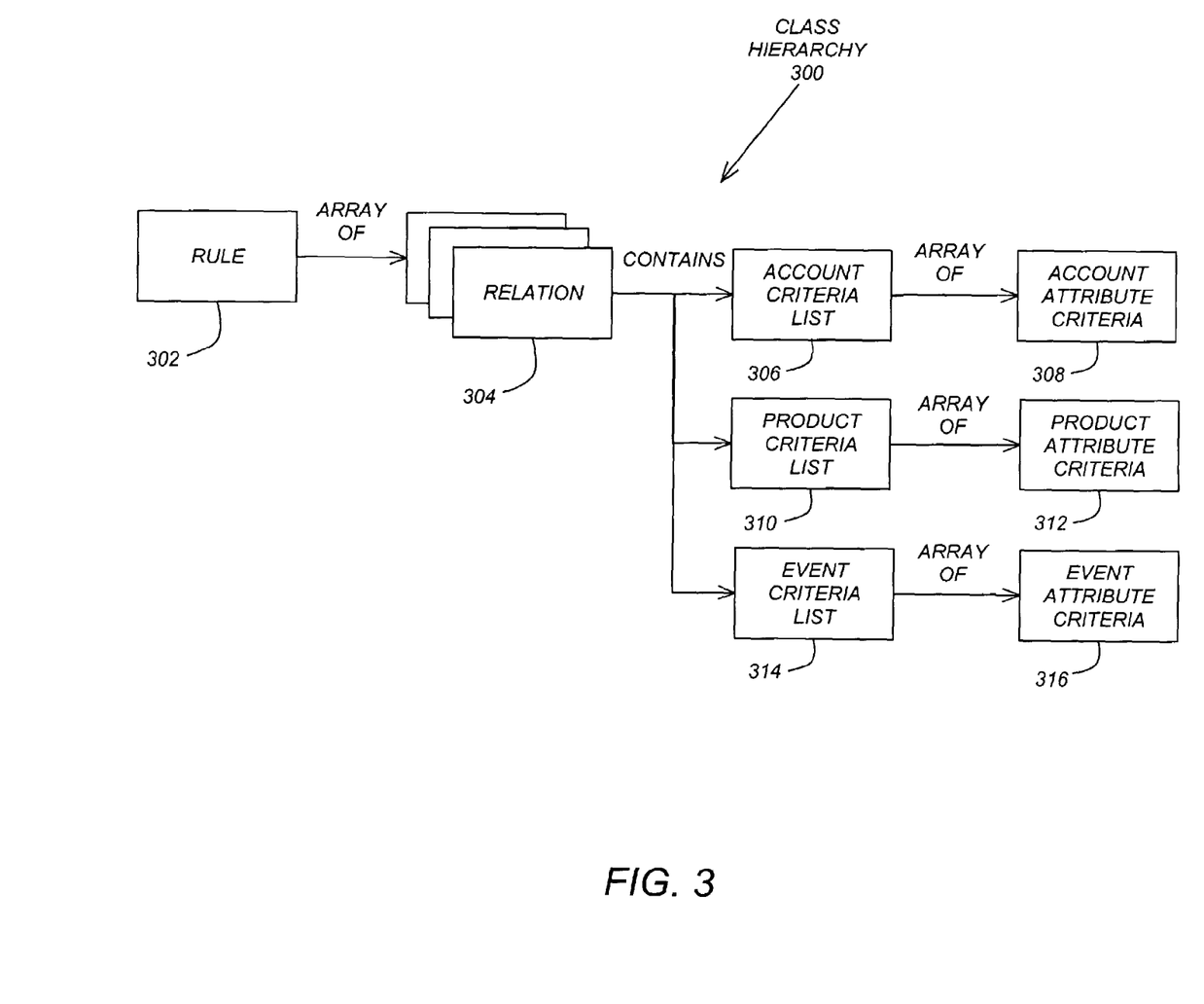
FIG. 3 illustrates an object-oriented representation of generic profitability rules in a Value Analyzer system according to the preferred embodiment of the present invention.

FIG. 3 illustrates a class hierarchy 300 according to the preferred embodiment of the present invention. The class hierarchy 300 is comprised of one or more objects, including a Rule 302 as a root node object. Each Rule 302 is comprised of an array of one or more Relations 304. Each Relation 304 may include an Account CriteriaList 306 (which is an array of Account Attribute Criteria 308), a Product Criteria List 310 (which is an array of Product Attribute Criteria 312), and an Event Criteria List 314 (which is an array of Event Attribute Criteria 316).

While not all types or levels of Rules 302 allow for all types of criteria 308, 312 and 316, including them all in the hierarchy 300 provides for a single, extensible base class specification. On the other hand, each type or level of Rules 302 will use at least one of the types of criteria 308, 312, 316.

Generic Rule Example:

Assume a Rule 302 includes the following Relations 304:
PRODUCT IN (PROD1, PROD2) AND STATUS=OPEN
OR
PRODUCT=PROD3 AND TERM>30 AND STATUS=OPEN In this example, "PRODUCT IN (PROD1, PROD2) AND STATUS=OPEN" is identified as Relation #1, and "PRODUCT=PROD3 AND TERM>30 AND STATUS OPEN" is identified as Relation #2.

Relation #1 contains one Account Attribute Criteria 308 and two Product Attribute Criteria 312, which are joined together and evaluated with an AND operator:

Account Attribute Criteria: STATUS=OPEN
AND
Product Attribute Criteria: PRODUCT IN (PROD1, PROD2)

Relation #2 contains two Account Attribute Criteria 308 and one Product Attribute Criteria 312, which are joined together and evaluated with an AND operator:

Account Attribute Criteria: STATUS=OPEN
AND
Account Attribute Criteria: TERM>30
AND
Product Attribute Criteria: PRODUCT=PROD3

Using this concept, the following describes how Rules 210 are implemented in an object-oriented representation.

Database Functionality

Users are able to add, modify, and delete Rules 302, Relations 304, Criteria Lists 306, 310 and 314 and Criteria 308, 312 and 316, as needed. Generally, the database functionality loops through the entire hierarchy 300 and saves each object individually. The objects are also retrieved in the same manner.

Graphical User Interface

The Value Analyzer Client 102 has the ability to display the entire hierarchy 300, as well as groups of objects or individual objects. Dialogs are provided that allow the users to insert, modify and delete the objects. The primary function is to display Rules 302, their Relations 304, Criteria Lists 306, 310 and 314 and Criteria 308, 312 and 316, to create new Rules 302, their Relations 304, Criteria Lists 306, 310 and 314 and Criteria 308, 312 and 316, and to modify Rules 302, their Relations 304, Criteria Lists 306, 310 and 314 and Criteria 308, 312 and 316. The tables in the relational database are updated as appropriate.

Detailed Class Specifications

Following are the class specifications for the various objects.

CBaseRule

This is the base class specification for all Rules 302. CRule, which is a class specification derived from the CBaseRule class specification, incorporates all of the functionality contained in this class specification, and extends it to support a CRelation class specification. Both CRule and CRelation are described in more detail below.

Attributes

Attributes of this class include the following:
Rule ID—An identifier for the Rule 302.
Rule Name—A name for the Rule 302.
Category Amount—A category amount.
Account Selection Method—An account selection method.
Category Amount Calculation Method—A category account calculation method.
Component ID—An identifier for a component of the Rule 302.
Apportionment Method—An apportionment method.
Amortize Indicator—An amortization indicator.
Rule Query—A query object used to load and save the Rule 302 from the relational database.
Row ID—A identifier of a row returned by the Rule Query.

Methods

The methods of this class include the following:
Default constructor—This method is used by the GUI to create a new, empty Rule 302.
Constructor—This method instantiates a Rule 302 and its attributes using data from the relational database or data entered by the user via the GUI.
Delete—This method deletes a Rule 302 from the relational database.
Save—This method saves a Rule 302 to the relational database.

CRule Class

This class specification is used to instantiate all types and levels of Rules 302. This class inherits the base functionality of the CBaseRule class, and extends it as requited for the specific type and level of Rule 302 being instantiated. The extensions may include both attributes and methods.

Attributes

The attributes of this class include all attributes of the base partition class (above), as well as the following:
Relations—An array of Relations 304 for the Rule 302.
Relation Query—A query object used to load Relations 304 associated with the Rule 302 from the relational database.

Methods

The methods of this class include the following:
Default constructor—This method is used by the GUI to create a new, empty Rule 302.
Constructor—This method instantiates a Rule 302 using data from the relational database or data entered by the user via the GUI.
LoadRelations—This method uses the Rule Id to build the Relation Query and retrieve the Relations 304 associated with the Rule 302 from the relational database. For each row of data returned, a Relation 304 is instantiated and placed in the Relations array.
AddRelations—This method adds a Relation 304 to the Relations array.
Delete—This method deletes all Relations 304, as well as associated Lists 306, 310 and 314, and Criteria 308, 312 and 316 by calling the Delete method of each Relation 304, wherein the Delete method of the associated Relations 304 deletes all corresponding Lists 306, 310 and 314, and Criteria 308, 312 and 316. Lastly, it deletes itself by calling a DeleteRow method of the Rule Query object.
Save—This method saves a Rule 302 using the Rule Query object, and then invokes the Save method of all associated Relations 304, which in turn invokes the Save method of all associated Lists 306, 310 and 314.

CRelation Class

The CRelation class specification is used to instantiate a Relation 304. Each Relation 304 corresponds to a combination of Selection Criteria that comprise account attributes, product attributes, and event attributes, as well as predicates, operations and functions operating thereon. In this context, each Relation 304 comprises one or more predicates or conditions. All of the Selection Criteria in a Relation 304 are joined together using an AND operator when executed.

Attributes

The attributes of this class include the following:
Rule ID—An identifier for the Rule 302.
Relation ID—An identifier for the Relation 304.
Relation Name—A name for the Relation 304.
Relation Type—Either base or adjustment.
Relation Query—A query used to load and save data for the Relation 304.
Relation Criteria Query—A query used to load and save data for the associated Lists 306, 310 and 314.

Account Criteria List—The Account Criteria List 306, which comprises an array of Account Attribute Criteria 308 associated with the Relation 304.

Product Criteria List—The Product Criteria List 310, which comprises an array of Product Attribute Criteria 312 associated with the Relation 304.

Event Criteria List—The Event Criteria List 314, which comprises an array of Event Attribute Criteria 316 associated with the Relation 304.

Methods

The methods of this class include the following:

Default constructor—This method used by the GUI to create a new Relation 304 and populate it manually.

Constructor—This method instantiates a Relation 304 and its attributes using data from the relational database or data entered by the user via the GUI.

AddAccountCriteria—This method is used by the GUI to add an Account Attribute Criteria 308 to the associated Account Criteria List 306. The Account Attribute Criteria 308 is created by the GUI, and then passed as a parameter to this method. Note that, if this method is called, and an Account Criteria List 306 has not yet been created, then one is created automatically.

AddProductCriteria—This method is used by the GUI to add a Product Attribute Criteria 312 to the associated Product Criteria List 310. The Product Attribute Criteria 312 is created by the GUI, and then passed as a parameter to this method. Note that, if this method is called, and a Product Criteria List 306 has not yet been created, then one is created automatically.

AddEventCriteria—This method is used by the GUI to add an Event Attribute Criteria 316 to the associated Event Criteria List 314. The Event Attribute Criteria 316 is created by the GUI, and then passed as a parameter to this method. Note that, if this method is called, and an Event Criteria List 314 has not yet been created, then one is created automatically.

Delete—This method deletes the Relation 304, and also calls the Delete methods for the associated Lists 306, 310 and 314 and Criteria 308, 312 and 316.

Save—This method saves the Relation 304, and also calls the Save methods for the associated Lists 306, 310 and 314 and Criteria 308, 312 and 316.

CAccountCriteriaList Class

This class specification is used to instantiate an Account Criteria List 306, which comprises an array of Account Attribute Criteria 308 (i.e., the account attribute selections) for a specific Relation 304.

Attributes

Relation ID—An identifier for the Relation 304.

Account Attribute Criteria—An array of Account Attribute Criteria 308.

Account Attribute List Query—A query object used to retrieve the list of

Account Attribute Criteria 308 from the relational database.

Account Attribute Query—A query object used to retrieve the Account Attribute Criteria 308 from the relational database.

Methods

Constructor—This method instantiates the Account Criteria List 306 using the Relation ID and then automatically retrieves the Account Attribute Criteria 308 for the Relation 304.

AddAccountAttributeCriteria—This method adds an Account Attribute Criteria 308 to the Account Criteria List 306.

Delete—This method deletes the Account Criteria List 306, and in turn calls the Delete method of each of the Account Attribute Criteria 308 for the Relation 304.

Save—This method saves the Account Criteria List 306, and in turn calls the Save method of each of the Account Attribute Criteria 308 for the Relation 304.

CProductCriteriaList Class

This class specification is used to instantiate the Product Criteria List 310, which comprises an array of Product Attribute Criteria 312 (i.e., the product attribute selections) for a specific Relation 304.

Attributes

Relation ID—An identifier for the Relation 304.

Product Attribute Criteria—An array of Product Attribute Criteria 312.

Product Attribute List Query—A query object used to retrieve the list of Product Attribute Criteria 312 from the relational database. P1 Product Attribute Query—A query object used to retrieve the individual Product Attribute Criteria 312 from the relational database.

Methods

Constructor—This method instantiates the Product Criteria List 310 using the Relation ID and then automatically retrieves the Product Attribute Criteria 312 for the Relation 304.

AddProductAttributeCritenia—This method adds a Product Attribute Criteria 312 to the Product Criteria List 310.

Delete—This method deletes the Product Criteria List 310, and in turn calls the Delete method of each of the Product Attribute Criteria 312 for the Relation 304.

Save—This method saves the Product Criteria List 310, and in turn calls the Save method of each of the Product Attribute Criteria 312 for the Relation 304.

CEventCriteriaList Class

This class specification is used to instantiate the Event CriteriaList 314, which comprises an array of Event Attribute Criteria 316 (i.e., the event attribute selections) for a specific Relation 304.

Attributes

Relation ID—An identifier for the Relation 304.

Event Attribute Criteria—An array of Event Attribute Criteria 316.

Event Attribute List Query—A query object used to retrieve the list of Event Attribute Criteria 316 from the relational database.

Event Attribute Query—A query object used to retrieve the individual Event Attribute Criteria 316 from the relational database.

Methods

Constructor—This method instantiates the Event Criteria List 314 using the Relation ID and then automatically retrieves the Event Attribute Criteria 316 for the Relation 304.

AddEventAttributeCriteria—This method adds an Event Attribute Criteria 316 to the Event Criteria List 314.

Delete—This method deletes the Event Criteria List 314, and in turn calls the Delete method of each of the Event Attribute Criteria 316 for the Relation 304.

Save—This method saves the Event Criteria List 314, and in turn calls the Save method of each of the Event Attribute Criteria 316 for the Relation 304.

CCriteria Class

This class specification is the base class specification for all Criteria 308, 312 and 316.

Attributes
  Relation ID—An identifier for the Relation 304. Criteria ID—An identifier for the Criteria 308, 312 or 316.
  Criteria Type—An indicator of the type of Criteria 308, 312, or 316.
  Criteria Query—A query object to load and save the Criteria 308, 312, or 316 from the relational database.
Methods
  Constructor—This method instantiates the Criteria 308, 312 or 316 using the Criteria ID and then automatically retrieves the Criteria 308, 312, or 316 for the Relation 304.
  Set Criteria Type Code—This method sets the type of Criteria 308, 312 or 316.
  Save—This method saves the Criteria 308, 312 or 316 to the relational database.
  Delete—This method deletes the Criteria 308, 312 or 316 from the relational database.
CAccountAttributeCriteria Class
  This class specification is used to instantiate the Account Attribute Criteria 308. This class specification inherits from the CCriteria class specification.
  Attributes
    Criteria ID—An identifier for the Account Attribute Criteria 308.
    Compare Type Code—A compare type code for the Account Attribute Criteria 308.
    Account Attribute Query—A query object used to load and save the Account Attribute Criteria 308.
  Method
    Constructor—This method instantiates the Account Attribute Criteria 308 the Account ID.
    Save—This method saves the Account Attribute Criteria 308 to the relational database.
    Delete—This method deletes the Account Attribute Criteria 308 from the relational database.
CProductAttributeCriteria Class
  This class specification is used to instantiate a Product Attribute Criteria 312. This class specification inherits from the CCriteria class specification.
  Attributes
    Product Id—An identifier for the Product Attribute Criteria 312.
    Product Group ID—An identifier of a product group.
    Operation Type Code—An identifier of an operation type.
    Product Attribute Query—A query object used to load and save the Product Attribute Criteria 312.
  Methods
    Constructor—This method instantiates the Product Attribute Criteria 308 the Criteria ID.
    Save—This method saves the Product Attribute Criteria 308 to the relational database.
    Delete—This method deletes the Product Attribute Criteria 308 from the relational database.
CEventAttributeCriteria Class
  This class specification is used to instantiate the Event Attribute Criteria 316. This class specification inherits from the CCriteria class specification.
  Attributes
    Attribute ID—An identifier for the Event Attribute Criteria 316.
    Compare Type Code—A compare type code for the Event Attribute Criteria 316.
    Event Attribute Query—A query object used to load and save the Event Attribute Criteria 316.
  Method
    Constructor—This method instantiates the Event Attribute Criteria 316 the Attribute ID.
    Save—This method saves the Event Attribute Criteria 316 to the relational database.
    Delete—This method deletes the Event Attribute Criteria 316 from the relational database.

Logic of the Preferred Embodiment

Figure 4:
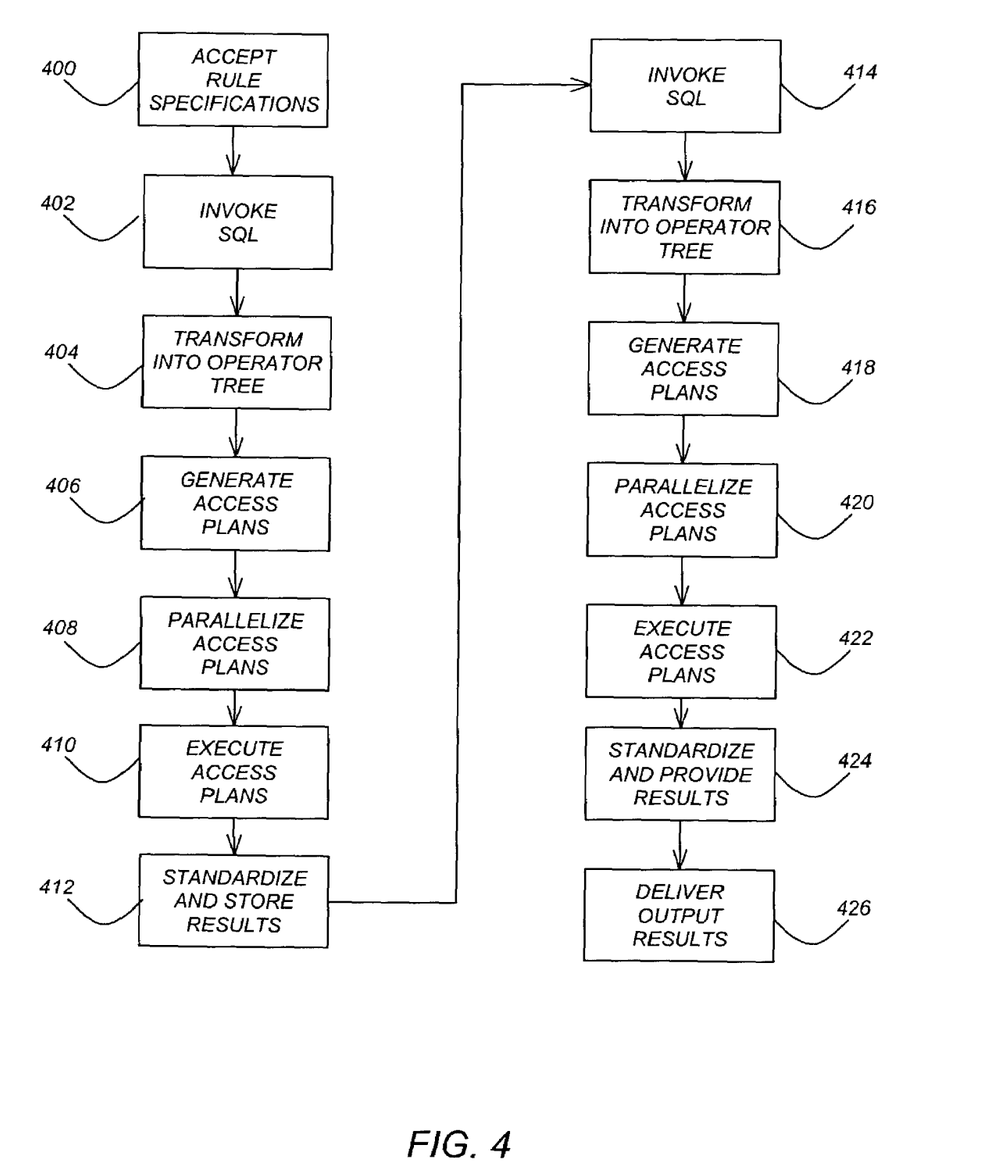
FIG. 4 is a flow chart illustrating the logic of the preferred embodiment of the present invention.

FIG. 4 is a flow chart illustrating the logic of the preferred embodiment of the present invention. Those skilled in the art will recognize that this logic is provided for illustrative purposes only and that different logic may be used to accomplish the same results.

Block 400 represents the Value Analyzer Client 102 accepting one or more rule specifications from the user.

Block 402 represents the Value Analyzer Calculation Engine 104 invoking one or more SQL macros in the RDBMS 106 to select accounts, products and events from the relational database based on the specified rules.

Block 404 represents the Parsing Engine 108 of the RDBMS 106 accessing the SQL macros and the SQL statements therein, and transforming the statements into an operator tree.

Block 406 represents the Parsing Engine 108 of the RDBMS 106 generating one or more access plans from the operator tree.

Block 408 represents the Parsing Engine 108 of the RDBMS 106 parallelizing the access plans, and then transmitting the access plans to their assigned Access Module Processors 110A-E of the RDBMS 106.

Block 410 represents the Access Module Processors 110A-E of the RDBMS 106 executing the access plans, and thereby performing the required data manipulation associated with the access plans received from the Parsing Engine 108, wherein the requited data manipulation associated with the access plans are performed in parallel by the Access Module Processors 110A-E.

Block 412 represents the Parsing Engine 108 of the RDBMS 106 standardizing the results received from the Access Module Processors 110A-E and storing the standardized results in the intermediate tables in the relational database.

Block 414 represents the Value Analyzer Calculation Engine 104 invoking one or more SQL macros in the RDBMS 106 to perform the calculation steps of the Profitability Calculations 200 by applying the rules to the results stored in the intermediate tables in the database.

Block 416 represents the Parsing Engine 108 of the RDBMS 106 accessing the SQL macros and the SQL statements therein, and transforming the statements into an operator tree.

Block 418 represents the Parsing Engine 108 of the RDBMS 106 generating one or more access plans from the operator tree.

Block 420 represents the Parsing Engine 108 of the RDBMS 106 parallelizing the access plans, and then transmitting the access plans to their assigned Access Module Processors 110A-E of the RDBMS 106.

Block 422 represents the Access Module Processors 110A-E of the RDBMS 106 executing the access plans, and thereby performing the required data manipulation associated with the access plans received from the Parsing Engine 108, wherein the required data manipulation associated with the access plans are performed in parallel by the Access Module Processors 110A-E.

Block 424 represents the Parsing Engine 108 of the RDBMS 106 standardizing the results received from the Access Module Processors 110A-E and providing the standardized results to the Value Analyzer Calculation Engine 104.

Block 426 represents the Value Analyzer Calculation Engine 104 delivering the output or results from the Profitability Calculations 200 to the Value Analyzer Client 102 and/or the RDBMS 106. With regard to the Value Analyzer Client 102, the results may be presented to the user, printed, or used by various other computer programs, as desired. With regard to the RDBMS 106, the results may be stored for later use by the Value Analyzer Client 102, the Value Analyzer Calculation Engine 104, or other computer programs, as desired.

CONCLUSION

This concludes the description of the preferred embodiment of the invention. The following paragraphs describe some alternative embodiments for accomplishing the same invention.

In one alternative embodiment, any type of computer or configuration of computers could be used to implement the present invention. In addition, any database management system, decision support system, on-line analytic processing system, or other computer program that performs similar functions could be used with the present invention.

In summary, the present invention discloses a Value Analyzer system, which is a data-driven computer-facilitated financial model that provides accurate and consistent profitability calculations using account, product and event attributes stored in a relational database managed by a relational database management system (RDBMS). Profitability calculations are performed in the computer by applying one or more rules to the account, product and event attributes accessed from the database, wherein each of the rules is represented as one or more objects in a hierarchy, the objects include one or more relations, criteria lists and criteria, each of the relations includes one or more of the criteria lists, and each of the criteria lists includes one or more of the criteria, and the criteria determine which accounts, products and events are processed in the profitability calculations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing financial processing in one or more computers, comprising:
   (a) accessing account, product and event attributes from a database, wherein: (1) the account attributes comprise data about accounts being measured, (2) the product attributes comprise data about products being purchased, and (3) the event attributes comprise data about account-related and product-related transactions; and
   (b) performing one or more profitability calculations by applying one or more rules to process the account, product and event attributes accessed from the database;
   (c) wherein each of the rules is represented as one or more objects in a hierarchy, the objects include one or more relations, criteria lists and criteria, each of the relations includes one or more of the criteria lists, and each of the criteria lists includes one or more of the criteria, and the criteria determine which of the account, product and event attributes are processed in the profitability calculations.

2. The method of claim 1, wherein the hierarchy includes a root node and the root node represents the rule.

3. The method of claim 1, wherein the criteria lists are selected from a group comprised of an account criteria list, product criteria list, and event criteria list.

4. The method of claim 1, wherein the criteria are selected from a group comprised of an account attribute criteria, product attribute criteria, and event attribute criteria.

5. The method of claim 1, wherein the criteria comprise one or more elements selected from a group comprising attributes, predicates, operators and functions.

6. The method of claim 1, wherein the criteria compare an attribute to another attribute, a literal value, or a result.

7. The method of claim 1, wherein each of the rules comprises at least one of the criteria lists and the criteria list comprises at least one of the criteria.

8. The method of claim 1, wherein the rules are selected from a group comprising Risk Provision (RP) Rules, Net Interest Revenue (NIR) Rules, Direct Expense (DE) Rules, Indirect Expense (IE) Rules, and Other Revenue (OR) Rules.

9. The method of claim 1, wherein the rules are selected from a group comprising Basic, Intermediate, Advanced, and Breakthrough Rules.

10. The method of claim 1, wherein the objects are stored in a relational database.

11. The method of claim 1, further comprising displaying the hierarchy.

12. The method of claim 1, wherein the objects include queries to load and save the objects.

13. The method of claim 1, wherein each of the relations corresponds to a combination of selection criteria that comprise account attributes, product attributes, and event attributes, as well as predicates, operations and functions operating thereon.

14. A system for financial processing, comprising:
   (a) means, performed by a computer, for accessing account, product and event attributes from a database, wherein: (1) the account attributes comprise data about accounts being measured, (2) the product attributes comprise data about products being purchased, and (3) the event attributes comprise data about account-related and product-related transactions; and
   (b) means, performed by a computer, for performing one or more profitability calculations by applying one or more rules to process the account, product and event attributes accessed from the database;
   (c) wherein each of the rules is represented as one or more objects in a hierarchy, the objects include one or more relations, criteria lists and criteria, each of the relations includes one or more of the criteria lists, and each of the criteria lists includes one or more of the criteria, and the criteria determine which of the account, product and event attributes are processed in the profitability calculations.

15. The system of claim 14, wherein the hierarchy includes a root node and the root node represents the rule.

16. The system of claim 14, wherein the criteria lists are selected from a group comprised of an account criteria list, product criteria list, and event criteria list.

17. The system of claim 14, wherein the criteria are selected from a group comprised of an account attribute criteria, product attribute criteria, and event attribute criteria.

18. The system of claim 14, wherein the criteria comprise one or more elements selected from a group comprising attributes, predicates, operators and functions.

19. The system of claim 14, wherein the criteria compare an attribute to another attribute, a literal value, or a result.

20. The system of claim 14, wherein each of the rules comprises at least one of the criteria lists and the criteria list comprises at least one of the criteria.

21. The system of claim 14, wherein the rules are selected from a group comprising Risk Provision (RP) Rules, Net Interest Revenue (NIR) Rules, Direct Expense (DE) Rules, Indirect Expense (IE) Rules, and Other Revenue (OR) Rules.

22. The system of claim 14, wherein the rules are selected from a group comprising Basic, Intermediate, Advanced, and Breathrough Rules.

23. The system of claim 14, wherein the objects are stored in a relational database.

24. The system of claim 14, further comprising means for displaying the hierarchy.

25. The system of claim 14, wherein the objects include queries to load and save the objects.

26. The system of claim 14, wherein each of the relations corresponds to a combination of selection criteria that comprise account attributes, product attributes, and event attributes, as well as predicates, operations and functions operating thereon.

27. An article of manufacture embodying logic for performing financial processing in a computer, the logic comprising:
(a) accessing account, product and event attributes from a database, wherein: (1) the account attributes comprise data about accounts being measured, (2) the product attributes comprise data about products being purchased, and (3) the event attributes comprise data about account-related and product-related transactions; and
(b) performing one or more profitability calculations by applying one or more rates to process the account, product and event attributes accessed from the database;
(c) wherein each of the rules is represented as one or more objects in a hierarchy, the objects include one or more relations, criteria lists and criteria, each of the relations includes one or more of the criteria lists, and each of the criteria lists includes one or more of the criteria, and the criteria determine which of the account, product and event attributes are processed in the profitability calculations.

28. The article of manufacture of claim 27, wherein the hierarchy includes a root node and the root node represents the rule.

29. The article of manufacture of claim 27, wherein the criteria lists are selected from a group comprised of an account criteria list, product criteria list, and event criteria list.

30. The article of manufacture of claim 27, wherein the criteria are selected from a group comprised of an account attribute criteria, product attribute criteria, and event attribute criteria.

31. The article of manufacture of claim 27, wherein the criteria comprise one or more elements selected from a group comprising attributes, predicates, operators and functions.

32. The article of manufacture of claim 27, wherein the criteria compare an attribute to another attribute, a literal value, or a result.

33. The article of manufacture of claim 27, wherein each of the rules comprises at least one of the criteria lists and the criteria list comprises at least one of the criteria.

34. The article of manufacture of claim 27, wherein the rules are selected from a group comprising Risk Provision (RP) Rules, Net Interest Revenue (NIR) Rules, Direct Expense (DE) Rules, Indirect Expense (IE) Rules, and Other Revenue (OR) Rules.

35. The article of manufacture of claim 27, wherein the rules are selected from a group comprising Basic, Intermediate, Advanced, and Breakthrough Rules.

36. The article of manufacture of claim 27, wherein the objects are stored in a relational database.

37. The article of manufacture of claim 27, further comprising displaying the hierarchy.

38. The article of manufacture of claim 27, wherein the objects include queries to load and save the objects.

39. The article of manufacture of claim 27, wherein each of the relations corresponds to a combination of selection criteria that comprise account attributes, product attributes, and event attributes, as well as predicates, operations and functions operating thereon.

* * * * *